(12) United States Patent
Sharma et al.

(10) Patent No.: US 8,082,260 B2
(45) Date of Patent: Dec. 20, 2011

(54) HANDLING CONTENT OF A READ-ONLY FILE IN A COMPUTER'S FILE SYSTEM

(75) Inventors: Anurag Sharma, Mountain View, CA (US); Amit Singh, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 329 days.

(21) Appl. No.: 11/669,760

(22) Filed: Jan. 31, 2007

(65) Prior Publication Data

US 2008/0183734 A1    Jul. 31, 2008

(51) Int. Cl.
G06F 17/30    (2006.01)

(52) U.S. Cl. ........ 707/756; 707/741; 707/755; 707/793; 707/803

(58) Field of Classification Search .................. 707/1, 9, 707/100, 101, 104.1, 200, 203, 754, 756, 707/793, 803, 822, 831; 713/189; 709/232
See application file for complete search history.

(56) References Cited

U.S. PATENT DOCUMENTS

| | | | | |
|---|---|---|---|---|
| 6,711,594 B2* | 3/2004 | Yano et al. | ............. | 707/999.204 |
| 6,952,772 B2* | 10/2005 | Deo et al. | ............. | 713/170 |
| 6,976,166 B2* | 12/2005 | Herley et al. | ............. | 713/165 |
| 7,099,848 B1* | 8/2006 | Bratton | ............. | 705/57 |
| 7,254,837 B2* | 8/2007 | Fields | ............. | 726/27 |
| 7,391,865 B2* | 6/2008 | Orsini et al. | ............. | 380/201 |
| 7,454,612 B2* | 11/2008 | Bolosky et al. | ............. | 713/165 |
| 7,484,103 B2* | 1/2009 | Woo et al. | ............. | 713/189 |
| 7,536,418 B2* | 5/2009 | Buchsbaum et al. | ............. | 707/999.2 |
| 2002/0010702 A1* | 1/2002 | Ajtai et al. | ............. | 707/101 |
| 2004/0049687 A1* | 3/2004 | Orsini et al. | ............. | 713/189 |
| 2006/0070096 A1* | 3/2006 | Nakano | ............. | 725/31 |
| 2007/0005974 A1* | 1/2007 | Kudou | ............. | 713/171 |
| 2007/0106907 A1* | 5/2007 | Rainsard et al. | ............. | 713/189 |
| 2007/0198463 A1* | 8/2007 | Sarakas | ............. | 707/1 |
| 2007/0253548 A1* | 11/2007 | Kameyama et al. | ............. | 380/28 |

* cited by examiner

Primary Examiner — Tim T Vo
Assistant Examiner — Dangelino Gortayo
(74) Attorney, Agent, or Firm — Leonard T. Guzman; Mohammed Kashef

(57) ABSTRACT

Embodiments of the invention relate to manipulating the original content of at least one original read-only computer file in a file-system of a computer system, where the computer system includes an operating system including a framework for in-line monitoring of accesses to the file-system. An exemplary embodiment, includes transforming the original content via a non-length-preserving data transformation algorithm, thereby resulting in transformed content, storing the transformed content in a transformed computer file, splitting the transformed computer tile into a first file and a second file, and associating the first file with the second file in the file-system. The non-length-preserving data transformation algorithm includes a length-increasing data transformation algorithm.

24 Claims, 16 Drawing Sheets

HANDLING CONTENT OF A READ-ONLY FILE IN A COMPUTER'S FILE SYSTEM

FIELD OF THE INVENTION

The present invention relates to a computer file-systems, and particularly relates manipulating the original content of at least one original read-only computer file in a computer file-system in a computer system, where the computer system includes an operating system including a framework for in-line monitoring of accesses to the file-system.

BACKGROUND OF THE INVENTION

A computer system typically includes a computer file-system. A computer system typically includes an operating system. The operating system may include a framework for in-line monitoring of accesses to the file-system. Such a framework could be a file-system filter driver.
Need for Manipulating the Original Content of an Original Read-Only Computer File Such a file-system filter driver would logically reside above the file-system stack and would have the ability to monitor and modify input/output requests that are sent to and completed from the underlying file-system. In addition, such a file-system filter driver could allow sophisticated file-data manipulation features, such as file data encryption and file data compression. Some modern operating systems support using file-system filter drivers to perform non-length preserving data transformations (e.g., file data encryption, file data compression). However, other operating systems do not provide such support. Thus, for those operating systems, there is a need to manipulate the original content of an original read-only computer file.
Challenges in Manipulating the Original Content of an Original Read-Only Computer File For example, an operating system based on Microsoft Corporation's Windows NT kernel (e.g., Windows 2000, Windows XP, Server 2003) does not support manipulating the original content of an original read-only computer file. Specifically, such an operating system does not support using file-system filter drivers to perform non-length preserving data transformations. Namely, in such an operating system, the underlying file-system discloses the on-disk length of the file to the operating system's cache manager directly, without giving any of the mounted filter drivers a chance to transform the length appropriately. For example, if a file were encrypted (using an algorithm that increases the file length)(i.e., transformed via a non-length preserving data transformation), the cache manager would see the encrypted file-length, which is larger than the decrypted length of the file. If the file were paged-in by the cache-manager for caching, the cache manager would attempt to stream in data past the decrypted end-of-file. Such an attempt would lead to incorrect computer system behavior or an application crash. Specifically, if the encrypted file were a kernel driver for the operating system, the computer system could display an operating system blue-screen and/or experience kernel panics.
Prior Art As shown in prior art FIG. 1, a typical prior art system (1) transforms the original content of a computer file via a non-length preserving data transformation algorithm, thereby resulting in transformed content, (2) stores the transformed content in a transformed computer file, (3) creates an in-memory state version of the original content, (4) implements each file system operation to support input/output to the in-memory state version, and (5) caches the in-memory state version. Unfortunately, such a system duplicates the functionality of the underlying file system by implementing a mini-file system in (3). Also, the system duplicates file system input/output support for the in-memory state version in (4). Also, the system duplicates file system caching in (5).

Therefore, a method and system of manipulating the original content of at least one original read-only computer file in a computer file-system in a computer system, where the computer system includes an operating system including a framework for in-line monitoring of accesses to the file-system, is needed.

SUMMARY OF THE INVENTION

The present invention provides a method and system of manipulating the original content of at least one original read-only computer file in a computer file-system in a computer system, where the computer system includes an operating system including a framework for in-line monitoring of accesses to the file-system. In an exemplary embodiment, the method and system include (1) transforming the original content via a non-length-preserving data transformation algorithm, thereby resulting in transformed content, (2) storing the transformed content in a transformed computer file, (3) splitting the transformed computer file into a first file ($F\_1$) and a second file ($F\_2$), and (4) associating the first file ($F\_1$) with the second file ($F\_2$) in the file-system. In an exemplary embodiment, the non-length-preserving data transformation algorithm includes a length-increasing data transformation algorithm (i.e., encryption).

In an exemplary embodiment, the splitting includes (a) writing an amount of the transformed content to the first file ($F\_1$) that equals the size of the original computer file and (b) saving the remainder of the transformed content to the second file ($F\_2$). In an exemplary embodiment, the writing includes writing the first N bytes of the transformed computer file to the first file ($F\_1$), where N equals the length of the original computer file. In an exemplary embodiment, the saving includes saving the bytes after the first N bytes of the transformed computer file to the second file ($F\_2$). In an exemplary embodiment, the saving includes denying direct open requests for the second file ($F\_2$).

In an exemplary embodiment, the associating includes, (a) if the file-system supports at least one alternate data stream, writing the second file ($F\_2$) as an alternate data stream of the first file ($F\_1$) and, (b) if the file-system does not support at least one alternate data stream, naming the second file ($F\_2$) with a name derived from the name of the first file ($F\_1$). In a further embodiment, the associating includes, if the file-system does not support at least one alternate data stream, removing the second file ($F\_2$) from a directory listing of the file-system. In a further embodiment, the naming includes naming the second file ($F\_2$) with a name derived from a cryptographic hash of at least the name of the first file ($F\_1$). In a further embodiment, the naming includes naming the second file ($F\_2$) with a name derived from a cryptographic hash of the name of the first file ($F\_1$) and the data of the first file ($F\_1$).

In a further embodiment, the present invention further includes, if a read request is received for the first file ($F\_1$), retrieving the original content from the first file ($F\_1$). In a further embodiment, the retrieving includes (a) recognizing that the first file ($F\_1$) resulted from the transforming, (b) locating the second file ($F\_2$) associated with the first file ($F\_1$), (c) given the byte offset and byte length of the request and based on the non-length-preserving data transformation algorithm used in the transforming, determining whether to retrieve the transformed content from the first file (F_1), from the second file (F_2), or from the first file (F_1) and the second file (F_2), (d) retrieving the transformed content, based on the determining, from the first file (F_1), from the second file (F_2), or from the first file (F_1) and the second file (F_2), (e) performing the inverse transformation of the non-length-preserving data transformation algorithm on the retrieved transformed content, thereby resulting in the original content, and (f) returning the original content.

In a further embodiment, the present invention further includes, if a close request is received for the first file (F_1), closing the first file (F_1) and the second file (F_2).

The present invention also provides a computer program product usable with a programmable computer having readable program code embodied therein of manipulating the original content of at least one original read-only computer file in a computer file-system in a computer system, where the computer system includes an operating system including a framework for in-line monitoring of accesses to the file-system. In an exemplary embodiment, the computer program product includes (1) computer readable code for transforming the original content via a non-length-preserving data transformation algorithm, thereby resulting in transformed content, (2) computer readable code for storing the transformed content in a transformed computer file, (3) computer readable code for splitting the transformed computer file into a first file (F_1) and a second file (F_2), and (4) computer readable code for associating the first file (F_1) with the second file (F_2) in the file-system.

The present invention also provides a method of providing a service to manipulate the original content of at least one original read-only computer file in a computer file-system in a computer system, where the computer system includes an operating system including a framework for in-line monitoring of accesses to the file-system. In an exemplary embodiment, the method includes (1) transforming the original content via a non-length-preserving data transformation algorithm, thereby resulting in transformed content, (2) storing the transformed content in a transformed computer file (3) splitting the transformed computer file into a first file (F_1) and a second file (F_2) and (4) associating the first file (F_1) with the second file (F_3) in the file-system.

THE FIGURES

DETAILED DESCRIPTION OF THE INVENTION

The present invention provides a method and system of manipulating the original content of at least one original read-only computer file in a computer file-system in a computer system, where the computer system includes an operating system including a framework for in-line monitoring of accesses to the file-system. In an exemplary embodiment, the method and system include (1) transforming the original content via a non-length-preserving data transformation algorithm, thereby resulting in transformed content, (2) storing the transformed content in a transformed computer file, (3) splitting the transformed computer file into a first file (F_1) and a second file (F_2), and (4) associating the first file (F_1) with the second file (F_2) in the file-system. In an exemplary embodiment, the non-length-preserving data transformation algorithm includes a length-increasing data transformation algorithm (i.e., encryption).

Figure 1:
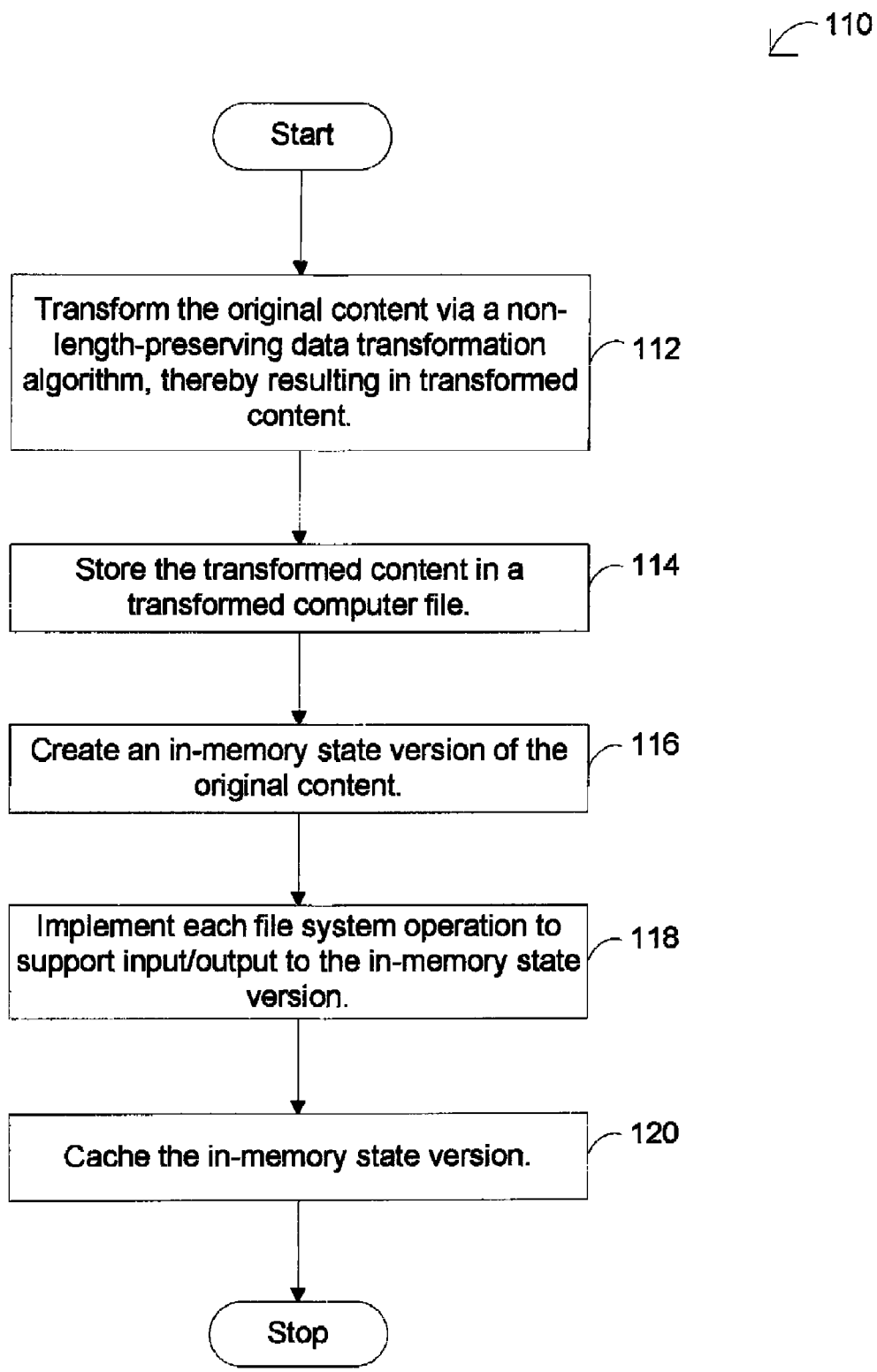
FIG. 1 is a flowchart of a prior art technique.
Figure 2:
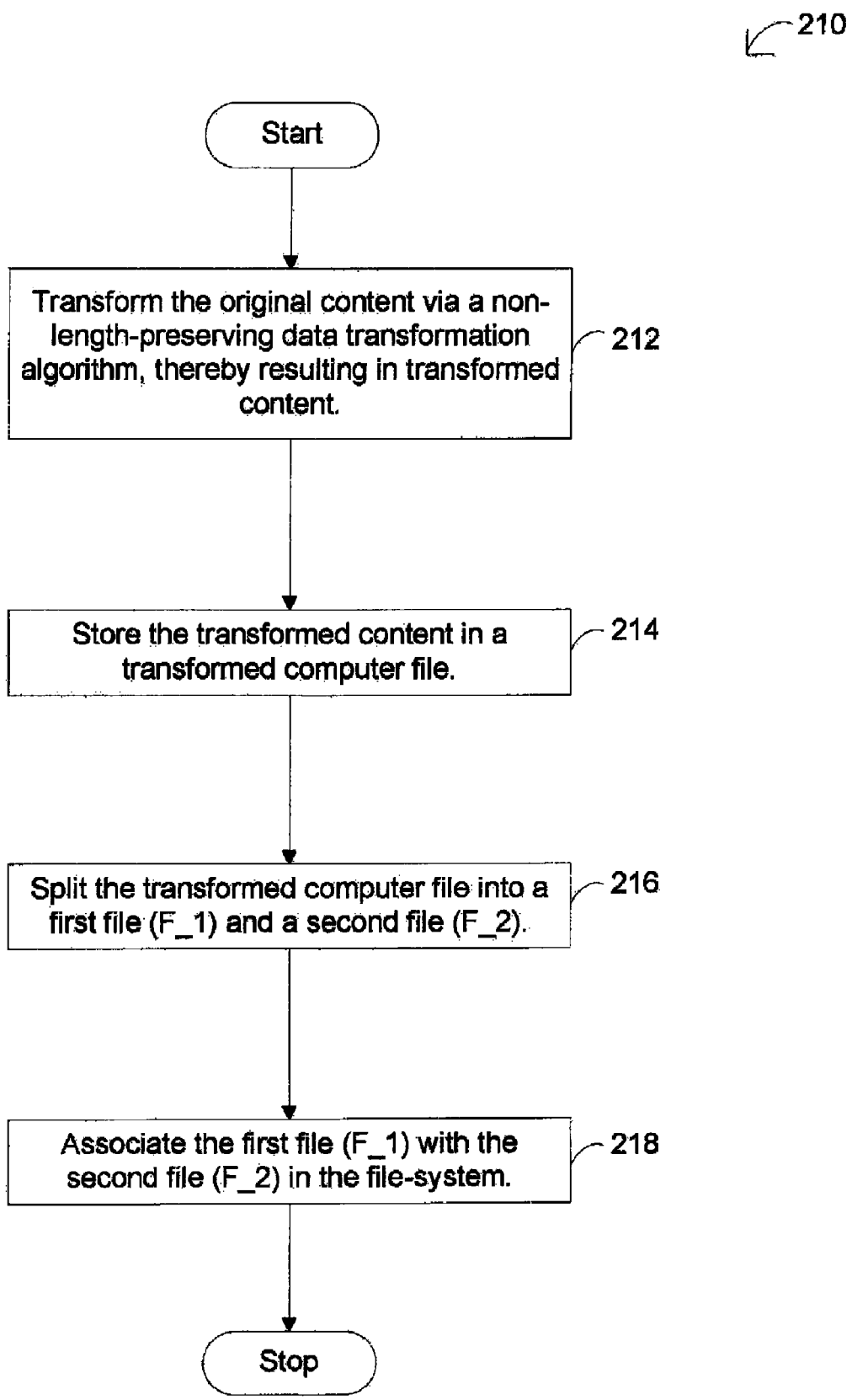
FIG. 2 is a flowchart in accordance with an exemplary embodiment of the present invention.

Referring to FIG. 2, in an exemplary embodiment, the present invention includes a step 212 of transforming the original content via a non-length-preserving data transformation algorithm, thereby resulting in transformed content, a step 214 of storing the transformed content in a transformed computer file, a step 216 of splitting the transformed computer file into a first file (F_1) and a second file (F_2), and a step 218 of associating the first file (F_1) with the second file (F_2) in the file-system.

Splitting

Figure 3:
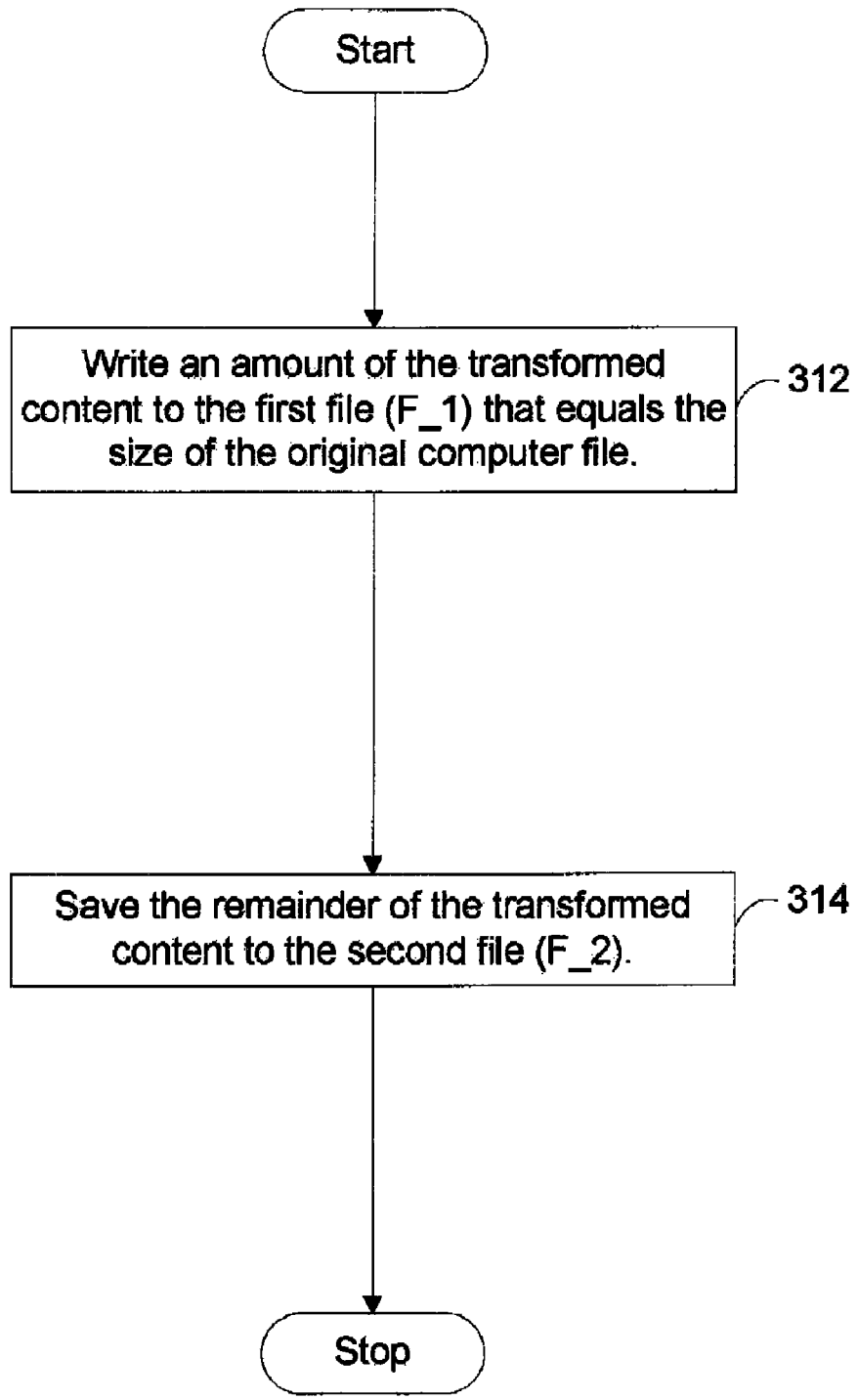
FIG. 3 is a flowchart of the splitting step in accordance with an exemplary embodiment of the present invention.

Referring to FIG. 3, in an exemplary embodiment, splitting step 216 includes a step 312 of writing an amount of the transformed content to the first file (F_1) that equals the size of the original computer file and a step 314 of saving the remainder of the transformed content to the second file (F_2).

Writing

Figure 4A:
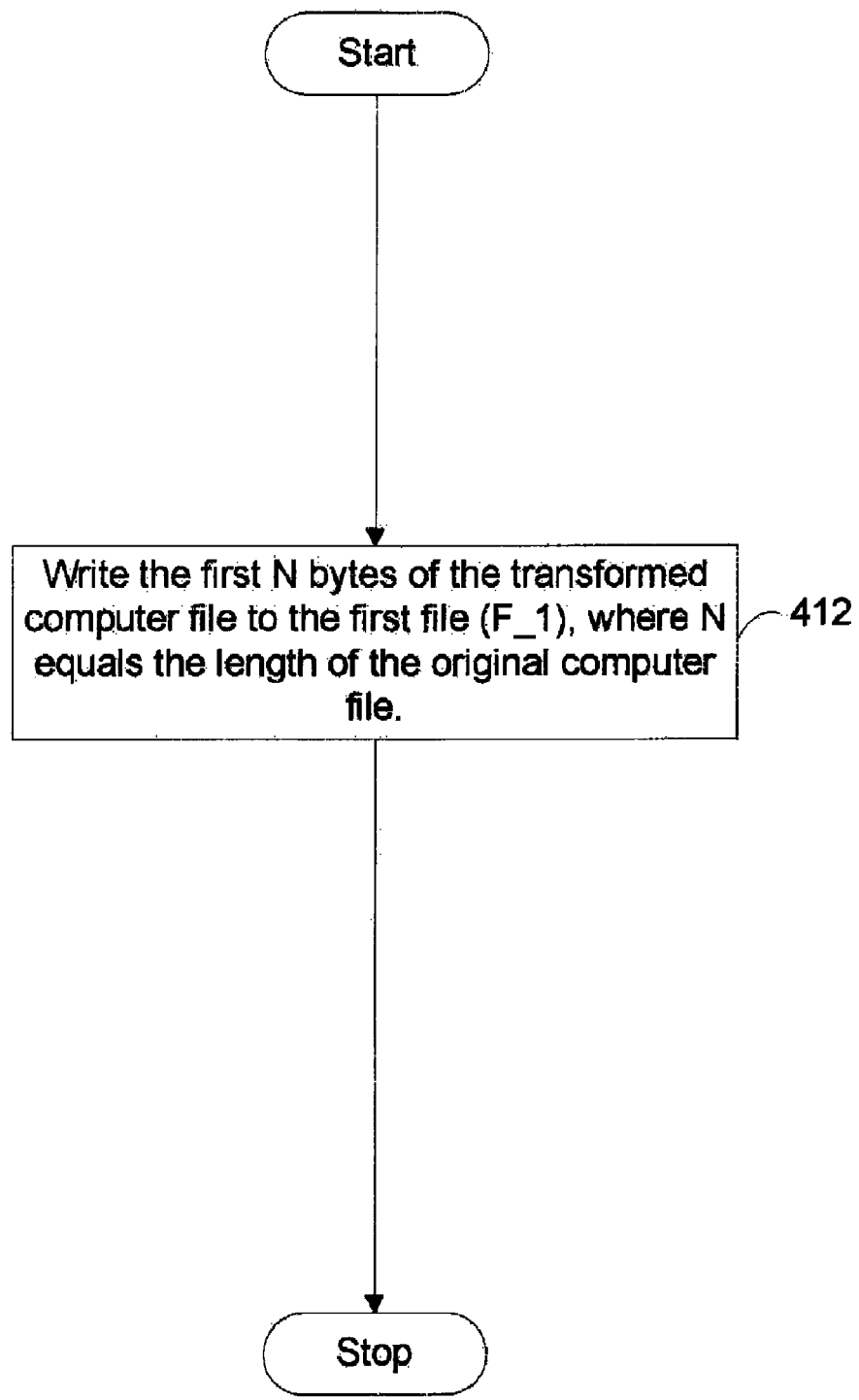
FIG. 4A is a flowchart of the writing step in accordance with an exemplary embodiment of the present invention.

Referring to FIG. 4A, in an exemplary embodiment, writing step 312 includes a step 412 of writing the first N bytes of the transformed computer file to the first file (F_1), where N equals the length of the original computer file.

Saving

Figure 4B:
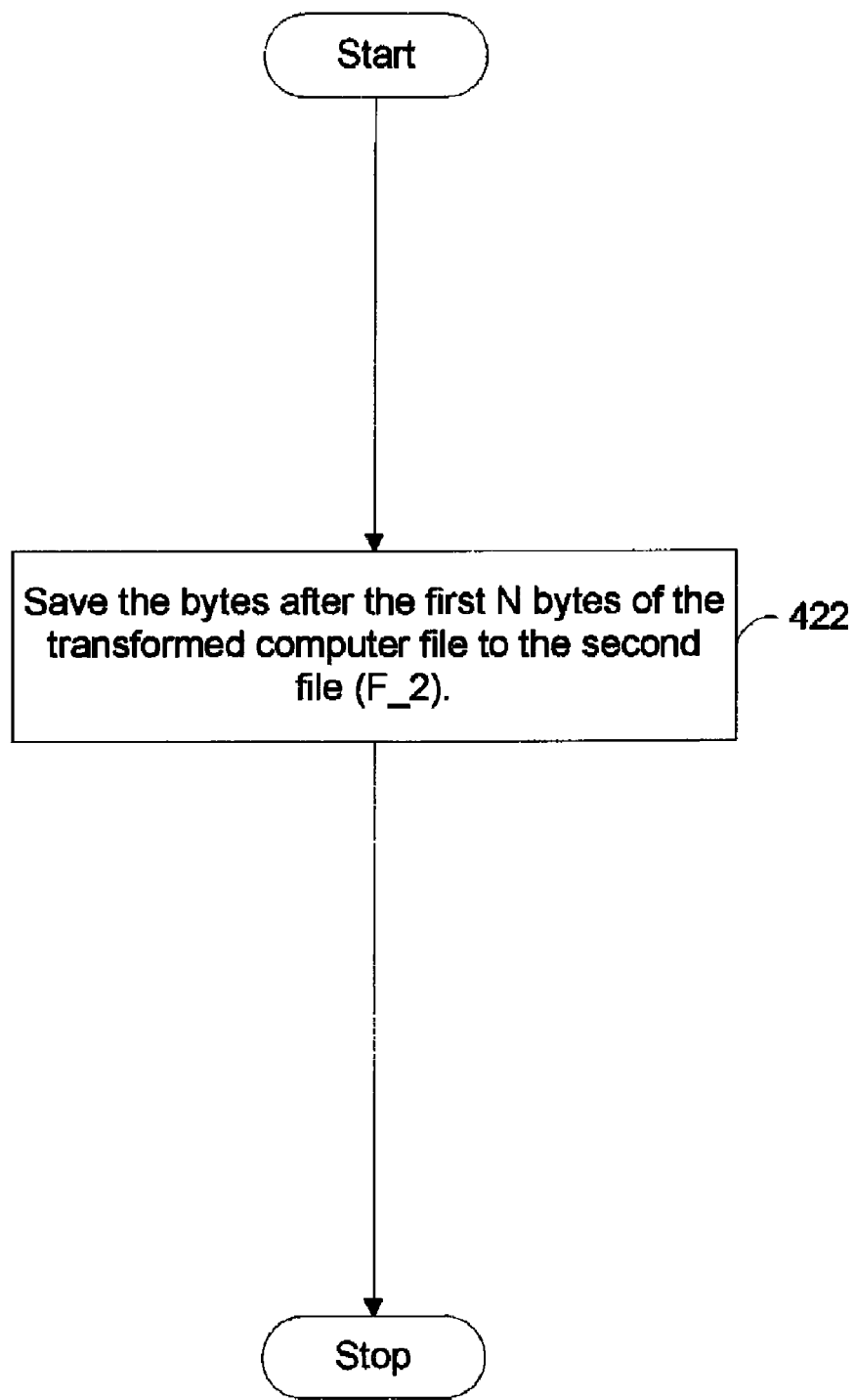
FIG. 4B is a flowchart of the saving step in accordance with an exemplary embodiment of the present invention.

Referring to FIG. 4B, in an exemplary embodiment, saving step 314 includes a step 422 of saving the bytes after the first N bytes of the transformed computer file to the second file (F_2).

Denying

Figure 4C:
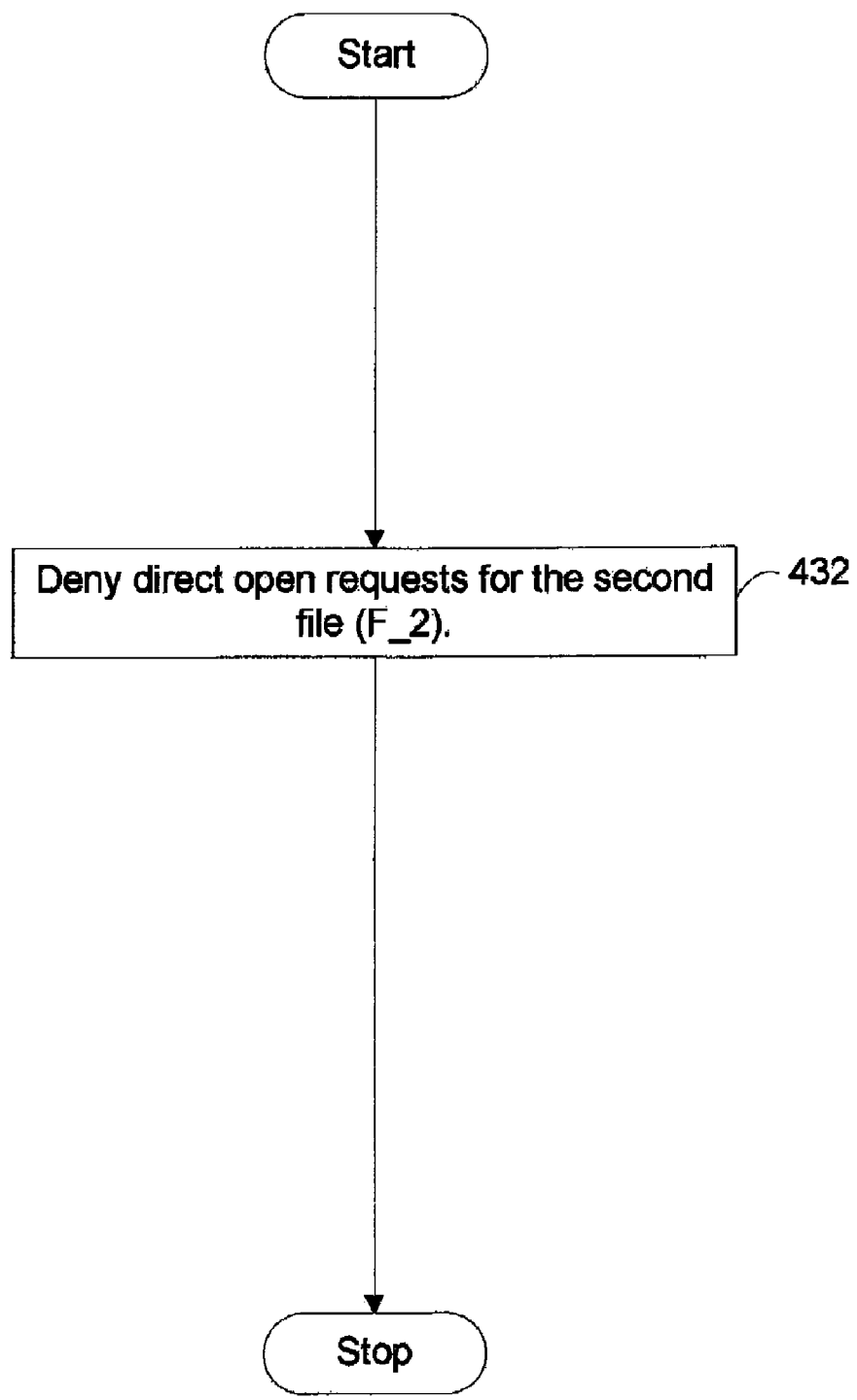
FIG. 4C is a flowchart of the saving step in accordance with an exemplary embodiment of the present invention.

Referring to FIG. 4C, in an exemplary embodiment, saving step 314 includes a step 432 of denying direct open requests for the second file (F_2).

Figure 5:
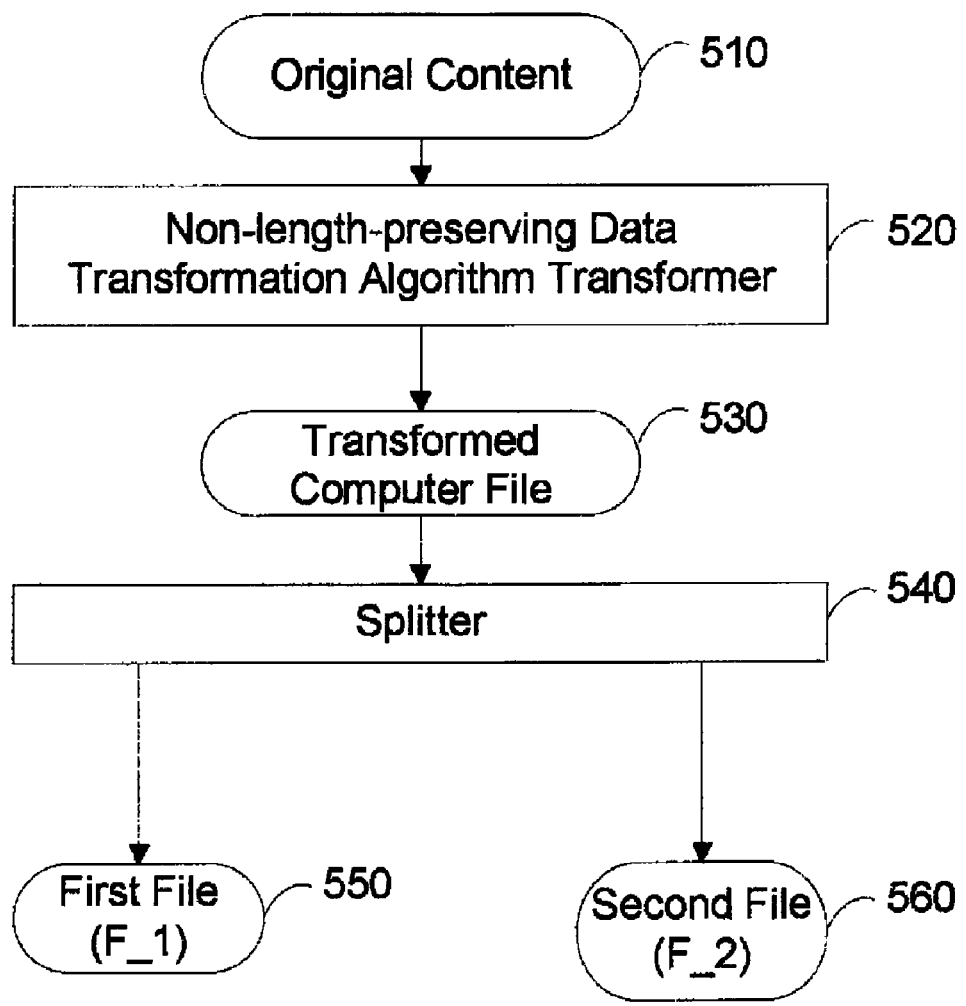
FIG. 5 is a block diagram in accordance with an exemplary embodiment of the present invention.

Referring to FIG. 5, in an exemplary embodiment, the present invention (a) transforms the original content 510 via a non-length preserving data transformation algorithm transformer 520, thereby resulting in transformed content, (b) stores the transformed content in a transformed computer file 530, and (c) splits, via a splitter 540, the transformed computer file into a first file (F_1) 550 and a second file (F_2) 560.

Associating

Figure 6A:
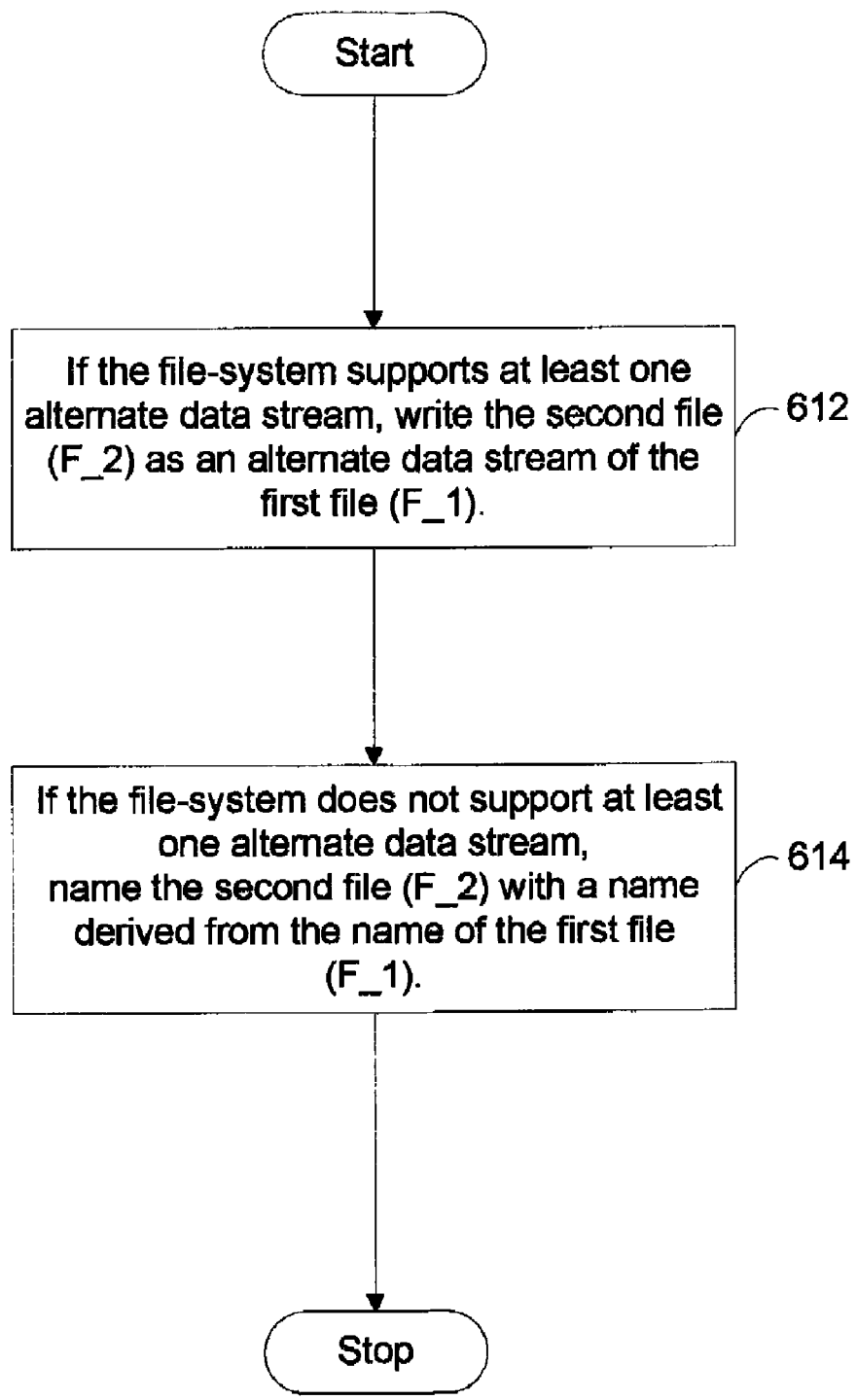
FIG. 6A is a flowchart of the associating step in accordance with an exemplary embodiment of the present invention.
Figure 6B:
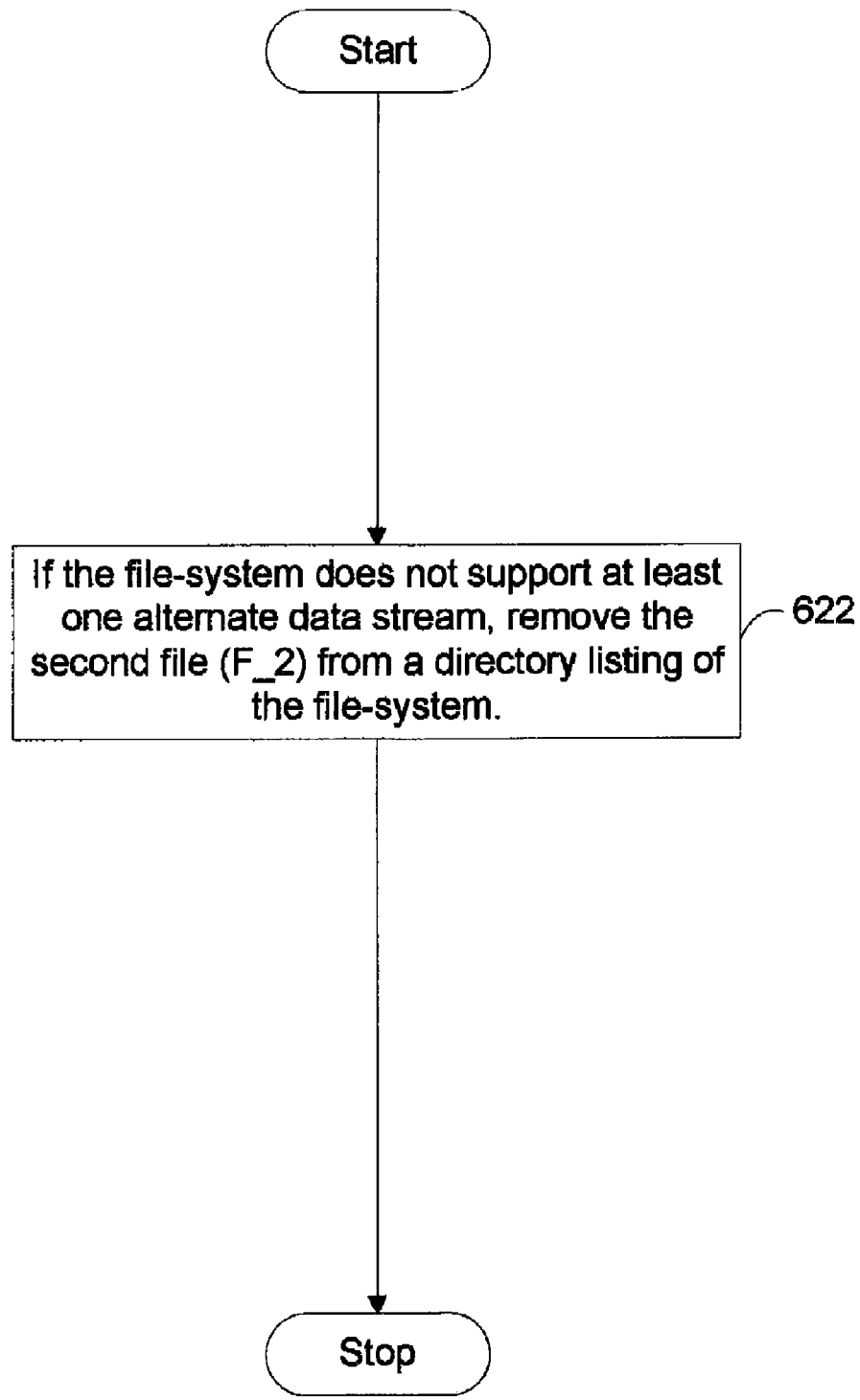
FIG. 6B is a flowchart of the associating step in accordance with a further embodiment of the present invention.

Referring to FIG. 6A, in an exemplary embodiment, associating step 218 includes a step 612 of, if the file-system supports at least one alternate data stream, writing the second file (F_2) as an alternate data stream of the first file (F_1) and a step 614 of, if the file-system does not support at least one alternate data stream, naming the second file (F_2) with a name derived from the name of the first file (F_1). Referring to FIG. 6B, in a further embodiment, associating step 218 further includes a step 622 of, if the file-system does not support at least one alternate data stream, removing the second file (F_2) from a directory listing of the file-system.

Naming

Figure 7A:
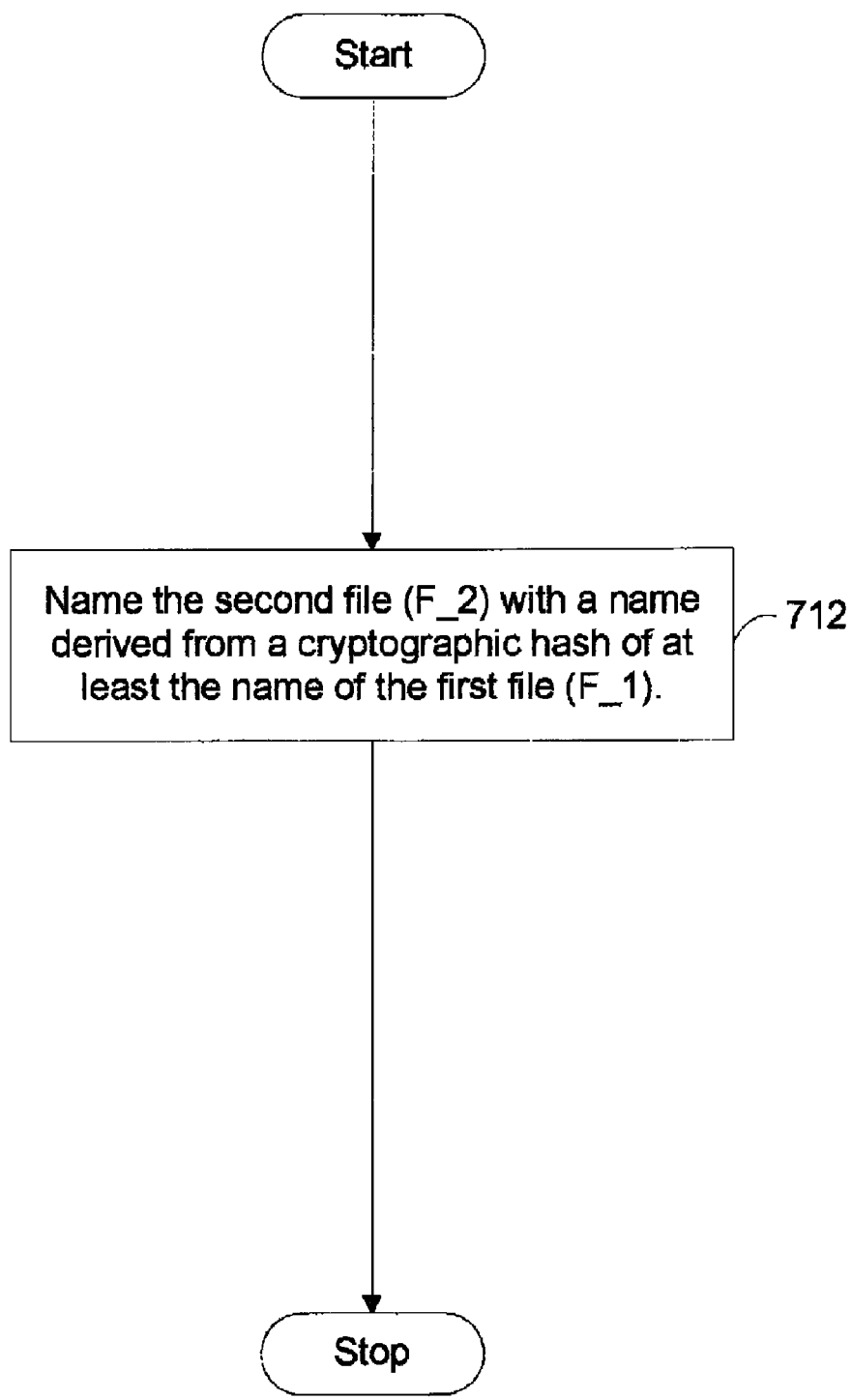
FIG. 7A is a flowchart of the naming step in accordance with an exemplary embodiment of the present invention.
Figure 7B:
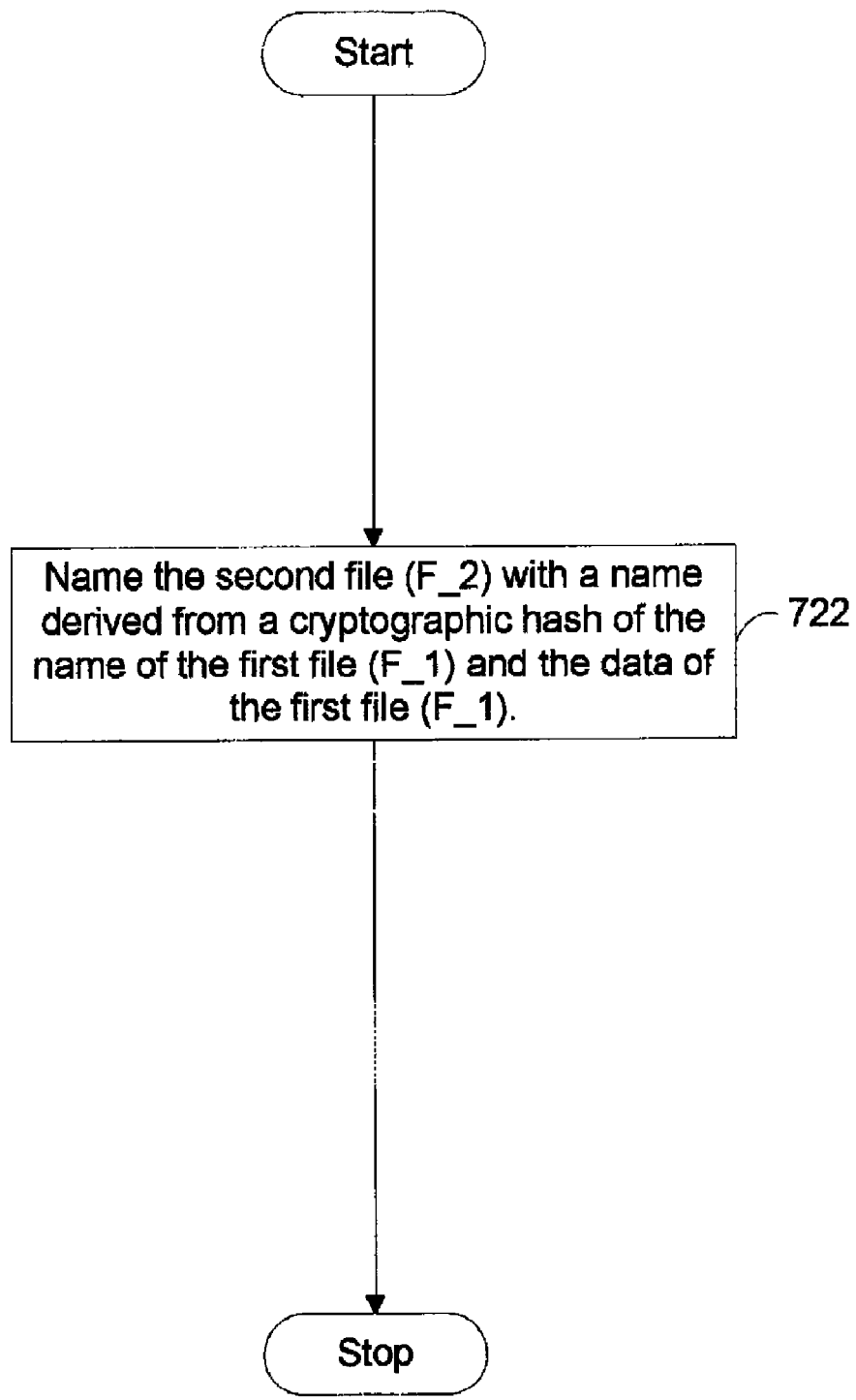
FIG. 7B is a flowchart of the naming step in accordance with an exemplary embodiment of the present invention.

Referring to FIG. 7A, in an exemplary embodiment, naming step 614 includes a step 712 of naming the second file (F_2) with a name derived from a cryptographic hash of at least the name of the first file (F_1). Referring to FIG. 7B, in a further embodiment, naming step 712 further includes a step 722 of naming the second file (F_2) with a name derived from a cryptographic hash of the name of the first file (F_1) and the data of the first file (F_1).

Figure 8A:
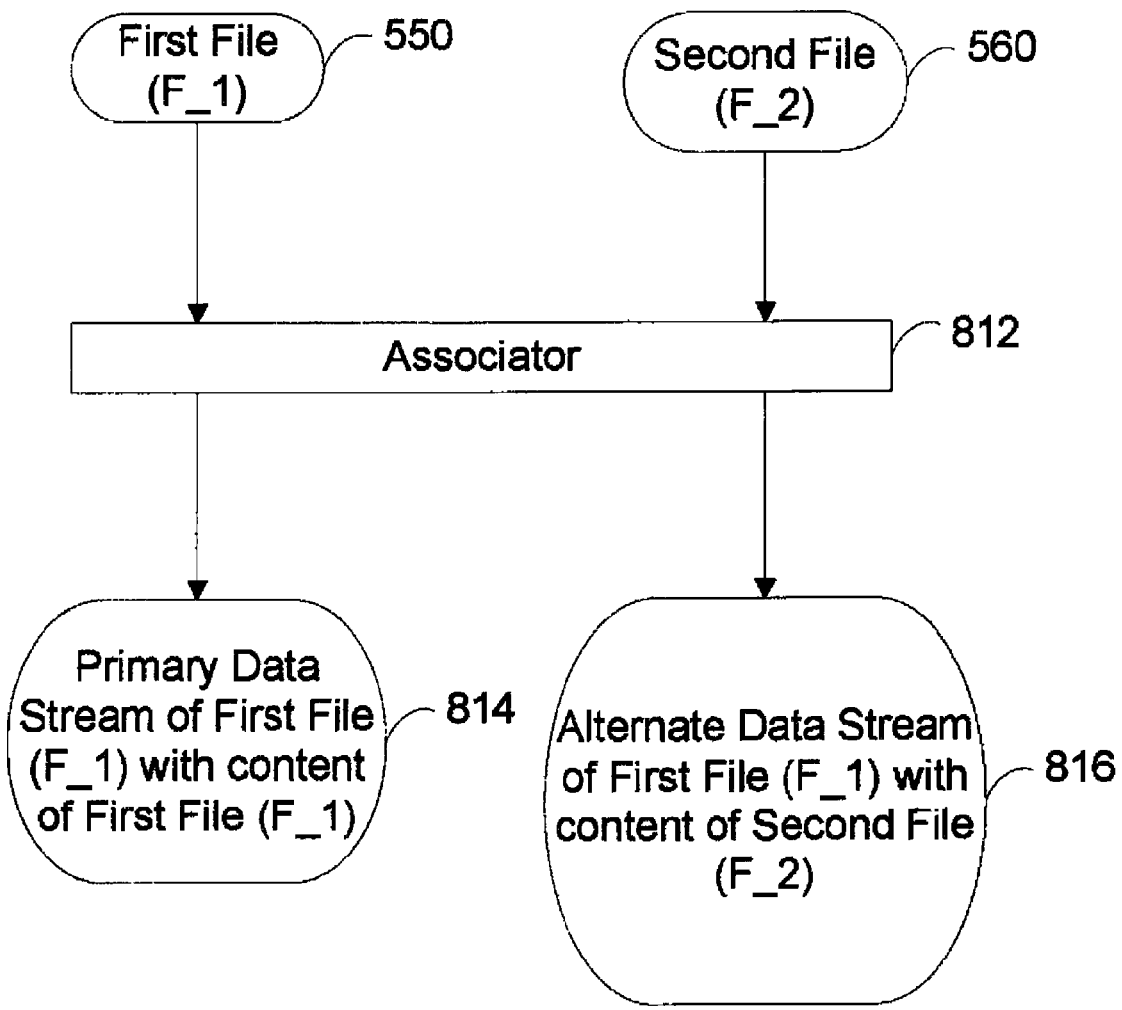
FIG. 8A is a block diagram in accordance with an exemplary embodiment of the present invention.
Figure 8B:
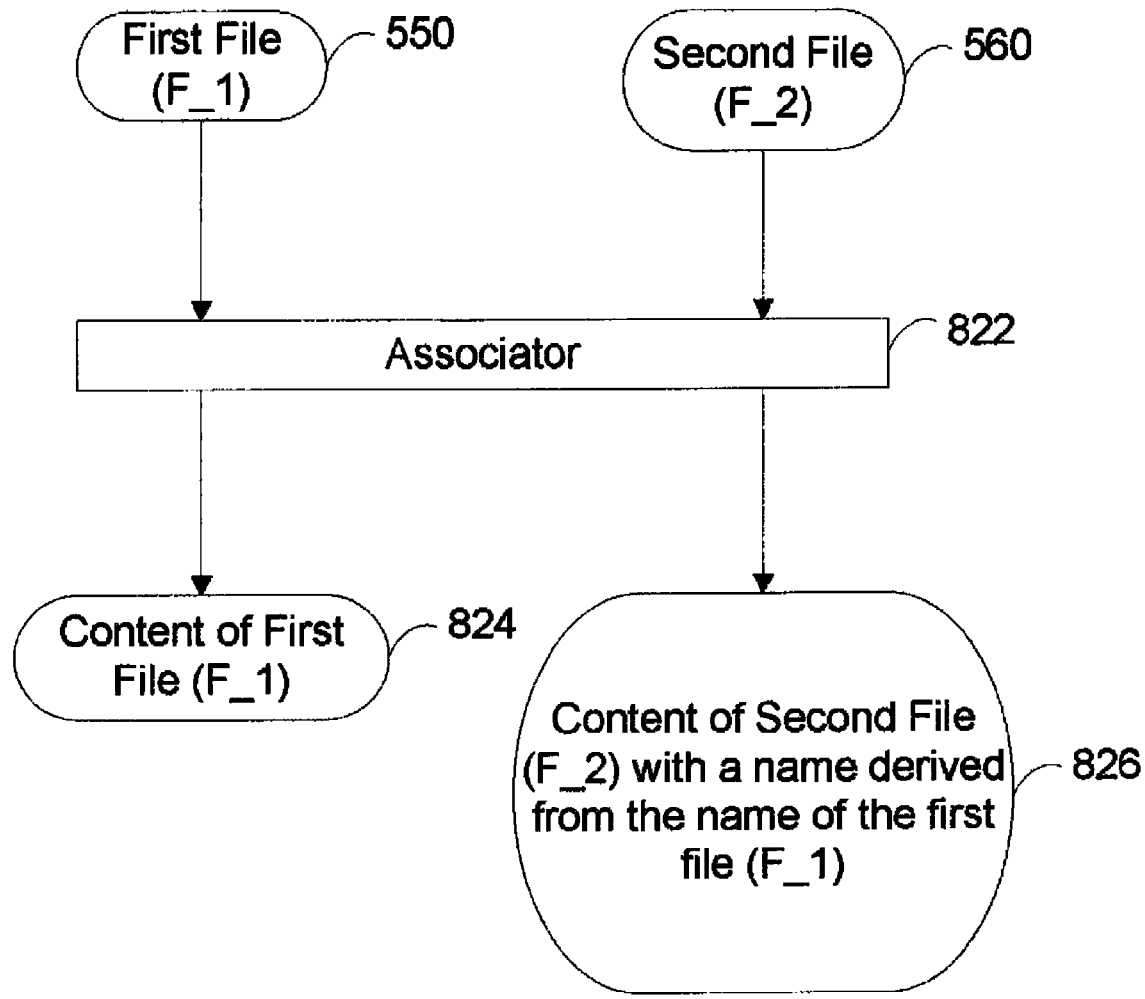
FIG. 8B is a block diagram in accordance with an exemplary embodiment of the present invention.

Referring to FIG. 8A, in an exemplary embodiment, the present invention (a) associates the first file (F_1) 550 with the second file (F_2) 560 in the file-system via an associator 812 and, (b) if the file-system supports at least one alternate data stream, writes the first file (F_1) as the primary data stream 814 of the first file (F_1) and writes the second (F_2) as an alternate data stream 816 of the first file (F_1). Referring to FIG. 8B, in an exemplary embodiment, the present invention (a) associates the first file (F_1) 550 with the second file (F_2) 560 in the file-system via an associator 822 and, (b) if the file-system does not support at least one alternate data stream, names the second file (F_2) with a name derived from the name of the first file (F_1), such that the content of the first file (F_1) 824 is associated with the content of the second file (F_2) 826.

Retrieving the Original Content

Figure 9A:
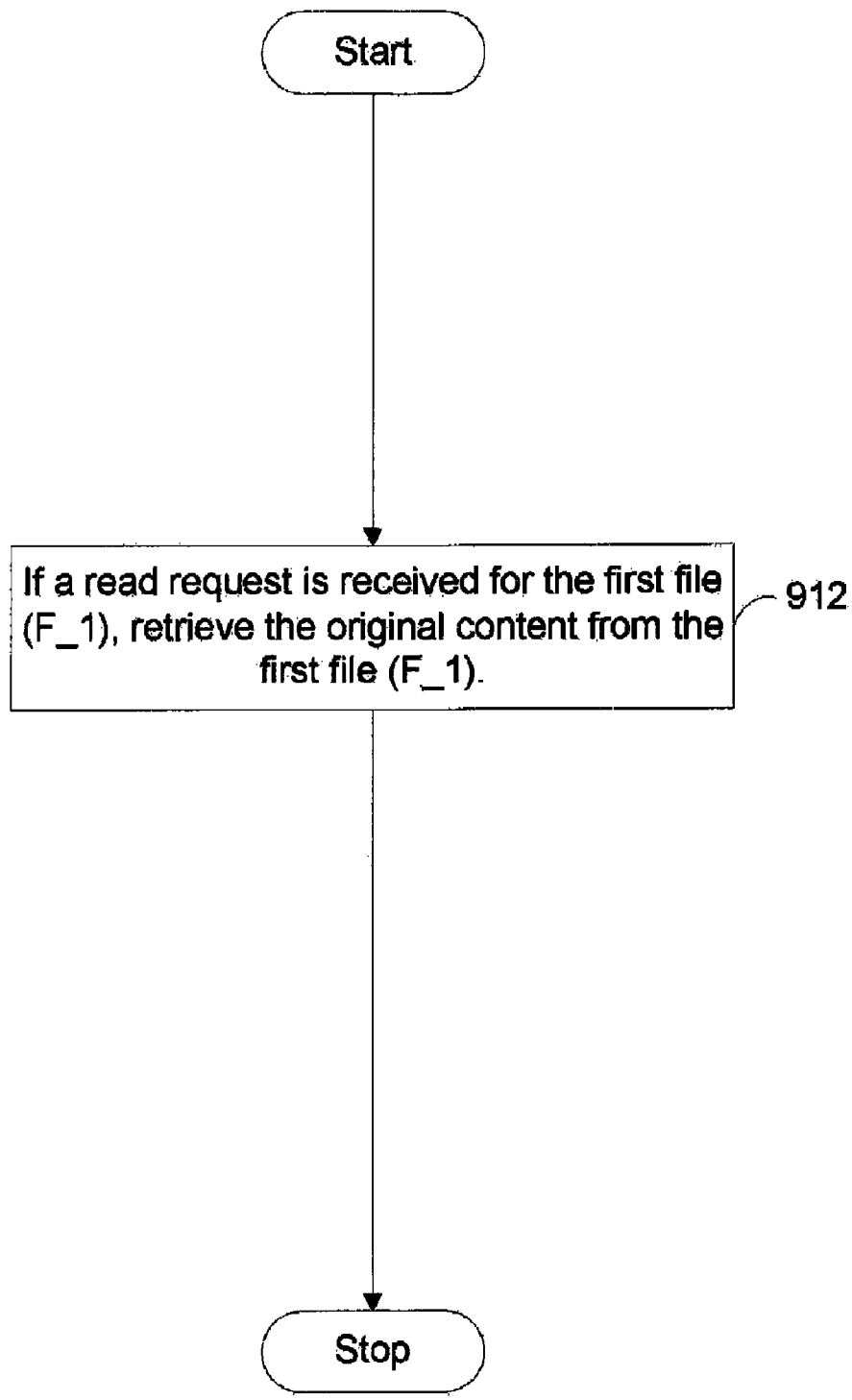
FIG. 9A is a flowchart of the retrieving step in accordance with an exemplary embodiment of the present invention.
Figure 9B:
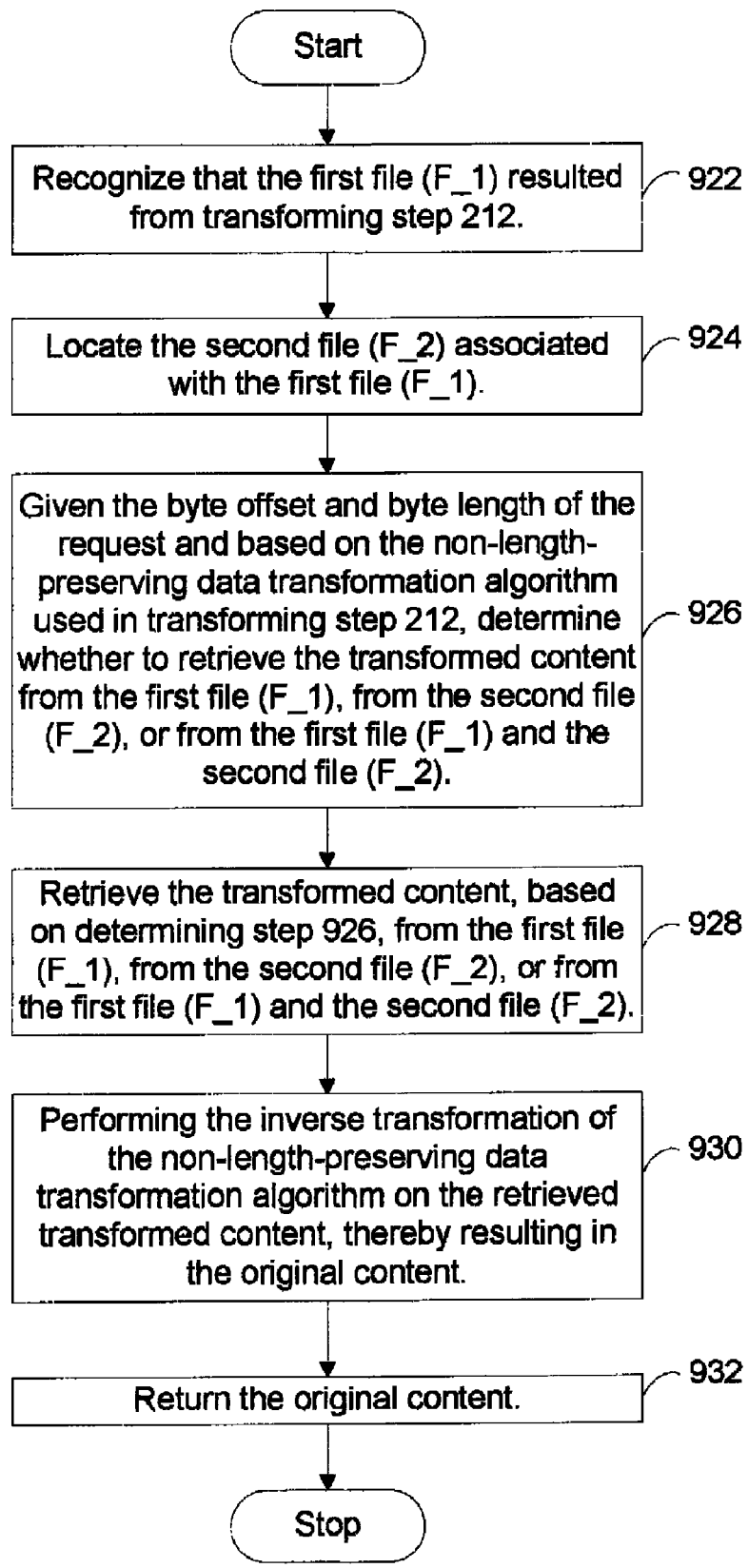
FIG. 9B is a flowchart of the retrieving step in accordance with a further embodiment of the present invention.

Referring to FIG. 9A, in a further embodiment, the method, system, and service further include a step 912 of, if a read request is received for the first file (F_1), retrieving the original content from the first file (F_1). Referring to FIG. 9B, in a further embodiment, retrieving step 912 further includes a step 922 of recognizing that the first file (F_1) resulted from transforming step 212, a step 924 of locating the second file (F_2) associated with the first file (F_1), a step 926 of, given the byte offset and byte length of the request and based on the non-length-preserving data transformation algorithm used in transforming step 212, determining whether to retrieve the transformed content from the first file (F_1), from the second file (F_2), or from the first file (F_1) and the second file (F_2), a step 928 of retrieving the transformed content, based on determining step 926, from the first file (F_1), from the second file (F_2), or from the first file (F_1) and the second file (F_2), a step 930 of performing the inverse transformation of the non-length-preserving data transformation algorithm on the retrieved transformed content, thereby resulting in the original content, and a step 932 of returning the original content.

In a specific embodiment, recognizing step 922 includes checking a special attribute to the first file (F_1) in order to determine if the first file (F_1) resulted from transforming step 212.

In an exemplary embodiment, if the non-length-preserving data transformation algorithm includes a length-decreasing data transformation algorithm (i.e., compression), the present invention includes padding the transformed file such that the length of the padded file (F_1) equals the length of the original file and such that the length of the second file (F_2) is 0 bytes.

Closing the Files

Figure 10:
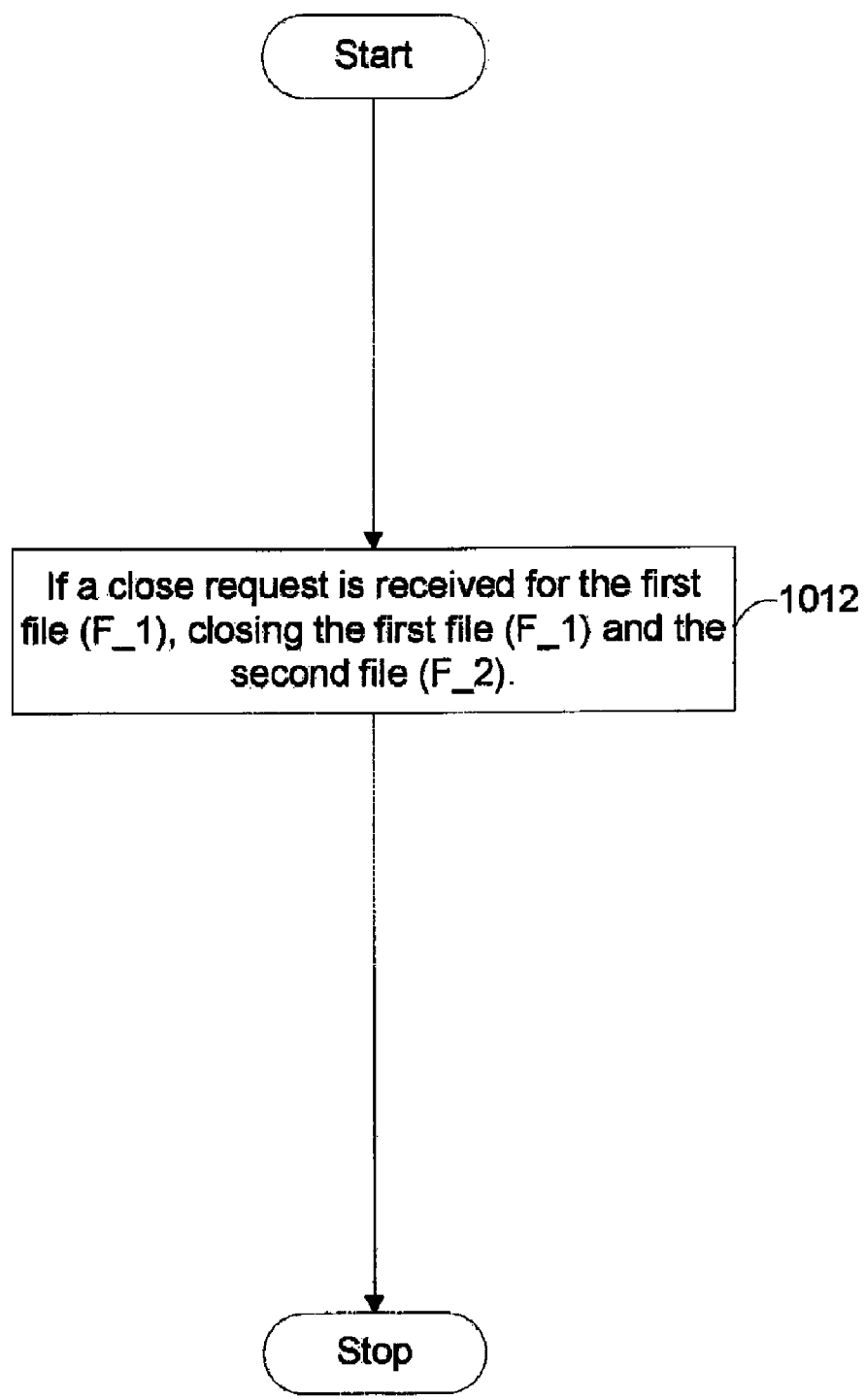
FIG. 10 is a flowchart of the closing step in accordance with an exemplary embodiment of the present invention.

Referring to FIG. 10, in a further embodiment, the method, system, and service further includes a step 1012 of, if a close request is received for the first file (F_1), closing the first file (F_1) and the second file (F_2).

General

The present invention can take the form of an entirely hardware embodiment, an entirely software embodiment, or an embodiment containing both hardware and software elements. In an exemplary embodiment, the present invention is implemented in software, which includes but is not limited to firmware, resident software, and microcode.

Furthermore, the present invention can take the form of a computer program product accessible from a computer-usable or computer-readable medium providing program code for use by or in connection with a computer system or any instruction execution system. The computer program product includes the instructions that implement the method of the present invention. A computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A computer system suitable for storing and/or executing program code includes at least one processor coupled directly or indirectly to memory elements through a system bus. The memory elements include local memory employed during actual execution of the program code, bulk storage, and cache memories that provide temporary storage of at least some program code to reduce the number of times code is retrieved from bulk storage during execution. Input/output (I/O) devices (including but not limited to keyboards, displays, pointing devices, etc.) can be coupled to the computer system either directly or through intervening I/O controllers. Network adapters may also be coupled to the computer system in order to enable the computer system to become coupled to other computer systems or remote printers or storage devices through intervening private or public networks. Modems, cable modems, and Ethernet cards are just a few of the currently available types of network adapters.

CONCLUSION

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A method of handling a read-only file that has been transformed using a non-length preserving data transformation algorithm and is stored in a file system of a computer comprising an operating system having a framework for in-line monitoring of the file system's accesses, the method comprising:
- transforming content of the read-only file using an operation selected from the group consisting of: a binary-to-text encoding, and a non-length preserving encryption;
- storing the transformed content in a transformed file;
- splitting the transformed file into a first file and a second file by:
  - writing an amount of data from the transformed content to the first file that equals the size of the content of the read-only file, and
  - saving the remainder of data from the transformed content to the second file;
- associating the first file with the second file in the file system such that the first file is considered the primary file and the second file is considered the secondary file for the transformed content;
- in response to a read request being received for the first file:
  - determining whether to retrieve the transformed content from: the first file, the second file, or the first file and the second file, wherein said determination is based on applying the non-length preserving data transformation algorithm to the read request's byte offset and byte length,
  - retrieving the transformed content based on said determining,
  - performing an inverse transformation of the retrieved transformed content using the non-length-preserving data transformation algorithm thereby resulting in the content of the read-only file, and
  - returning the resulting content.

2. The method of claim 1, wherein said splitting prevents errors when the first file is paged-in by a cache-manager of the operating system by ensuring that the cache-manager sees the size of the first file to be equal to the size of the read-only file and thereby preventing reads of the transformed content beyond the size of the read-only file's plain text.

3. The method of claim 1, wherein writing comprises writing the first N bytes of the transformed file to the first file, wherein N equals the size of the content of the read-only file.

4. The method of claim 3, wherein the saving comprises saving the bytes after the first N bytes of the transformed file to the second file.

5. The method of claim 1, wherein associating the first file with the second file in the file system comprises denying direct open requests for the second file.

6. The method of claim 1, wherein associating comprises:
- if the file system supports at least one alternate data stream, writing the second file as an alternate data stream of the first file; and
- if the file system does not support at least one alternate data stream, naming the second file with a name derived from the name of the first file.

7. The method of claim 6, further comprising:
- if the file system does not support at least one alternate data stream, removing the second file from a directory listing of the file system.

8. The method of claim 6, wherein naming comprises naming the second file with a name derived from a cryptographic hash of the name of the first file.

9. The method of claim 8, wherein naming further comprises naming the second file with a name derived from a cryptographic hash of the name of the first file and the data of the first file.

10. The method of claim 1, further comprising:
- in response to a close request being received for the first file, closing the first file and the second file.

11. The method of claim 1, further comprising:
- in response to an open request being received for the first file: opening the first file, determining the second file's location, and opening the second file.

12. A system of handling a read-only file that has been transformed using a non-length preserving data transformation algorithm and is stored in a file system of a computer comprising an operating system having a framework for in-line monitoring of the file system's accesses, the system comprising:
- a transforming module configured to transform content of the read-only file using an operation selected from the group consisting of: a binary-to-text encoding, and a non-length preserving encryption;
- a storing module configured to store the transformed content in a transformed file;
- a splitting module configured to split the transformed file into a first file and a second file by:
  - writing an amount of data from the transformed content to the first file that equals the size of the content of the read-only file, and
  - saving the remainder of data from the transformed content to the second file;
- an associating module configured to associate the first file with the second file in the file system such that the first file is considered the primary file and the second file is considered the secondary file for the transformed content;
- a closing module configured to, in response to a read request being received for the first file:
  - determine whether to retrieve the transformed content from: the first file, the second file, or the first file and the second file, wherein said determination is based on applying the non-length preserving data transformation algorithm to the read request's byte offset and byte length,
  - retrieve the transformed content based on said determining,
  - perform an inverse transformation of the retrieved transformed content using the non-length-preserving data transformation algorithm thereby resulting in the content of the read-only file, and
  - return the resulting content.

13. The system of claim 12, wherein said splitting prevents errors when the first file is paged-in by a cache-manager of the operating system by ensuring that the cache-manager sees the size of the first file to be equal to the size of the read-only file and thereby preventing reads of the transformed content beyond the size of the read-only file's plain text.

14. The system of claim 12, wherein the writing module is further configured to write the first N bytes of the transformed computer file to the first file, wherein N equals the size of the content of the read-only file.

15. The system of claim 14, wherein the saving module is further configured to save the bytes after the first N bytes of the transformed to the second file.

16. The system of claim 12, wherein the associating module is further configured to deny direct open requests for the second file.

17. The system of claim 12, wherein the associating module is further configured to:
- if the file system supports at least one alternate data stream, write the second file as an alternate data stream of the first file; and if the file system does not support at least one alternate data stream, name the second file with a name derived from the name of the first file.

18. The system of claim 17, further comprising:
a removing module configured to, if the file system does not support at least one alternate data stream, remove the second file from a directory listing of the file system.

19. The system of claim 17, wherein the naming module is further configured to name the second file with a name derived from a cryptographic hash of the name of the first file.

20. The system of claim 19, wherein the naming module is further configured to name the second file with a name derived from a cryptographic hash of the name of the first file and the data of the first file.

21. The system of claim 12, further comprising:
a closing module configured to, in response to a close request being received for the first file, close the first file and the second file.

22. A computer program product usable with a programmable computer having readable program code embodied therein of handling a read-only file that has been transformed using a non-length preserving data transformation algorithm and is stored in a file system of a computer system comprising an operating system having a framework for in-line monitoring of the file system's accesses, the computer program product comprising:
computer readable code for transforming content of the read-only file using an operation selected from the group consisting of: a binary-to-text encoding, and a non-length preserving encryption;
computer readable code for storing the transformed content in a transformed file;
computer readable code for splitting the transformed file into a first file and a second file by:
writing an amount of data from the transformed content to the first file that equals the size of the content of the read-only file, and
saving the remainder of data from the transformed content to the second file;
associating the first file with the second file in the file system such that the first file is considered the primary file and the second file is considered the secondary file for the transformed content;
in response to a read request being received for the first file, computer readable code for:
determining whether to retrieve the transformed content from: the first file, the second file, or the first file and the second file, wherein said determination is based on applying the non-length preserving data transformation algorithm to the read request's byte offset and byte length,
retrieving the transformed content based on said determining,
performing an inverse transformation of the retrieved transformed content using the non-length-preserving data transformation algorithm thereby resulting in the content of the read-only file, and
returning the resulting content.

23. The computer program product of claim 22, wherein said splitting prevents errors when the first file is paged-in by a cache-manager of the operating system by ensuring that the cache-manager sees the size of the first file to be equal to the size of the read-only file and thereby preventing reads of the transformed content beyond the size of the read-only file's plain text.

24. The computer program product of claim 22, further comprising:
in response to an open request being received for the first file, computer readable code for: opening the first file, determining the second file's location, and opening the second file.

* * * * *